United States Patent [19]

Hahn

[11] Patent Number: 4,595,552
[45] Date of Patent: Jun. 17, 1986

[54] INJECTION MOLD GATE APPARATUS

[75] Inventor: Roger A. Hahn, Arvada, Colo.

[73] Assignee: Adolph Coors Company, Golden, Colo.

[21] Appl. No.: 681,099

[22] Filed: Dec. 13, 1984

[51] Int. Cl.⁴ .................................................. B29F 1/022
[52] U.S. Cl. ............................. 264/328.1; 264/328.9; 425/533; 425/543; 425/562; 425/564
[58] Field of Search .............. 425/533, 543, 562, 564; 264/537, 328.1, 328.9; 249/105

[56] References Cited

U.S. PATENT DOCUMENTS

| | | | |
|---|---|---|---|
| 3,014,241 | 12/1961 | Hehl | 425/562 X |
| 3,301,928 | 1/1967 | Plynhale | 425/533 X |
| 3,503,095 | 3/1970 | Uhlig | 425/533 |
| 4,057,609 | 11/1977 | Uhlig | 425/533 X |
| 4,295,811 | 10/1981 | Sauer | 425/533 X |
| 4,498,860 | 2/1985 | Gahan | 425/562 |
| 4,521,177 | 6/1985 | Blank et al. | 425/533 |

*Primary Examiner*—J. Howard Flint, Jr.
*Attorney, Agent, or Firm*—Klaas & Law

[57] ABSTRACT

An injection mold apparatus for forming molded plastic articles comprising a polymer supply source; a mold cavity; conduit connecting the mold cavity and the supply source; an injection assembly for injecting molten polymer into the mold cavity and a gate valve associated with the conduit and having an elongate central passage terminating in an outlet orifice and a needle positioned in skewed relationship with the elongate central passage and selectively insertable into the orifice in a closed position and retractable from the orifice and the elongate central passage to provide an unrestricted polymer flow in an open position.

12 Claims, 4 Drawing Figures

INJECTION MOLD GATE APPARATUS

BACKGROUND OF THE INVENTION

The present invention relates generally to injection molding apparatus and, more particularly, to a needle valve gate assembly used in an injection molding apparatus to prevent the creation of weld lines and similar defects in a molded article produced by the apparatus, and particularly, to prevent the creation of weld lines in polystyrene parisons formed by the apparatus and used as a preform in the blowing of plastic bottles.

Containers constructed from thermoplastic material have become widely used in the beverage industry, competing with traditional metal and glass containers. Attractive features of plastic containers include resistance to rupture; transparency, allowing viewing of the bottled contents; and light weight, reducing shipping costs. However, a drawback of thermoplastic beverage bottles has been the relatively high cost of the plastic materials which are presently used to produce such bottles. Polystyrene is a low cost material which is readily available as a by-product from the formation of more expensive plastic materials. However, there are presently no polystyrene containers in commercial use as containers for pressurized beverages. Polystyrene bottles to be economically feasible must be capable of being produced rapidly and, as a finished product must have sufficient strength to withstand rupture under normal use and to contain beverages under pressure without significant distortion. The physical characteristics of polystyrene make use of this plastic in pressurized containers which may be economically mass produced quite different.

The formation of a plastic bottle usually includes the step of producing a tube shaped preform or "parison" in an injection molding operation and thereafter allowing the parison to cool to a some degree. Next, the parison is placed in a pressure chamber wherein a pressure differential and usually heat are applied to the container to cause it to expand into the shape of the finished plastic bottle. The time period for each of these operations is preferably kept as short as possible to increase the speed of production.

However, it has been found that since polystyrene has inferior strength characteristics to most plastics used in bottles, the wall thickness of a polystyrene bottle must generally be thicker than with other plastics. Thus, the parison used to produce the blow molded polystyrene bottle must also be relatively thick. The increased thickness of the polystyrene bottle causes a significant problem from a production cost standpoint. Since the injection molded parison is thicker than most parisons used in the formation of plastic bottles, the cooling time of the polystyrene parison must be longer in order to prevent crystalization or similar phenomena caused by rapid cooling which adversely affects the strength and other characteristics of the completed parison. Since the cooling time of the parison is a critical economic parameter, it is desirable to heat the polystyrene to the lowest temperature possible which will still allow proper polymer flow through the injection mold. However, if the temperature of the molten polystyrene in the injection mold becomes too low, certain undesirable features, such as weld lines occur in the parison being formed and/or the later formed blow molded bottle.

Thus, lowering of the temperature of the molten plastic during injection molding without producing adverse physical affects in the parison being formed is critical to the production cost of polystyrene bottles.

The use of injection molds for forming plastic articles is well known. A typical injection mold includes a hopper apparatus which is filled with a plurality of plastic pellets. The hopper apparatus dispenses the particles into an auger or screw device which has a progressively narrower pitch extending outwardly from the hopper device which causes the "solid" plastic pellets to be heated and compressed as they are moved away from the hopper. At the end of the auger device, distal the hopper, the plastic pellets have been sufficiently compressed and heated by friction to assume a liquid state. A high temperature, high pressure, high viscosity molten polymer is thus dispensed from the auger orifice and is directed through suitable valve and conduit means to a mold cavity which defines the shape of an article to be produced. One conventional manner for controlling the flow of molten polymer to the mold cavity includes passing the molten polymer leaving the auger device through a three way valve. In one position, the liquid plastic is directed from the auger through the valve into an injection pot having a moving piston therein which is withdrawn to cause the pot to receive molten polymer from the auger. When the injection pot is sufficiently filled with molten polymer, the three way valve is shifted such that the injection pot is placed in communication, through a suitable conduit and valve arrangement, with the mold cavity of the apparatus. A needle valve gate assembly is generally provided in the conduit between the mold cavity and the injection pot in order to precisely control the flow of molten polymer into the cavity. When it is desired inject the mold cavity with molten polymer, the needle valve is withdrawn from the orifice of the conduit and the piston portion of the injection pot is urged in a direction to expel the polymer therefrom. Thereafter polymer flows out of the injection pot through the three way valve and connecting conduit, and the needle valve assembly into the mold cavity.

It is conventional for a gate assembly used in this type of apparatus to comprise a short, straight length, conduit portion which terminates in a conical shaped orifice in which the needle valve seats. Such a conventional gate assembly also comprises a needle valve having an elongate needle with a central longitudinal axis positioned coaxially with the central longitudinal axis of the short, straight length conduit portion. In order to close the gate, a tip portion of the needle is urged axially into closing relationship with the orifice portion of the conduit. In order to open the gate, the needle is withdrawn a short distance axially thus allowing a flow of polymer around the needle and out through the orifice. The needle generally extends axially rearwardly until passing out of the short length conduit portion through a rear wall seal portion thereof. Thus, the polymer is forced to "split" and flow around the needle through the entire short, straight length portion of the conduit immediately prior to passing out the discharge orifice of the conduit.

It is a discovery of the present applicants that due to the elastic memory of the molten polymer, this splitting of the polymer flow to flow around the needle, at lower temperature ranges, causes imperfections in the article being molded which are manifested in the form of "weld lines". Weld lines refer to relatively narrow lines formed in the plastic which indicate the presence of a weakened zone in the plastic article being formed. Until applicants discovery, the manner of reducing weld lines in a polystyrene forming process was to increase the operating temperature of the polymer. However, in a commercial setting, this led to one of two undesirable results. An article having inferior strength characteristics is formed if cooled in the same time period as articles formed at lower temperatures. And, if the article is allowed to cool slowly, the increased cooling time substantially increased the production time and thus increased the fabrication costs of the article.

It is applicants' discovery that the construction of the needle valve that is currently in use in the industry contributes significantly to the formation of weld lines and associated problems in injection molded products. The needle valve of applicants' invention allows completely unrestricted flow through the end portion of the conduit which passes liquid polymer to the mold cavity when the gate assembly is open and thus eliminates or greatly reduces the occurrence of weld lines and other associated problems over a considerable operating range as compared to the results when a conventional needle valve is used.

SUMMARY OF THE INVENTION

The present invention comprises a new gate assembly used in an injection molding process which, over a considerable operating range, reduces formation of weld lines and other undesirable characteristics in a plastic article being formed by providing an unrestricted flow path at the terminal end portion of a conduit which supplies liquid polymer to the mold cavity. In one embodiment of the invention, the gate assembly comprises a needle valve having a longitudinal axis intersecting the longitudinal axis of a terminal portion of the polymer supply conduit at an acute angle. By providing the needle in a skewed relationship with respect to the axis of the conduit, the needle may be entirely withdrawn through a sidewall of the conduit and an associated seal apparatus to provide a completely unrestricted flow path for the polymer when the needle valve is in an open position. The needle valve is closed in the same manner as a conventional needle valve by insertion of a tip portion thereof into tight sealing engagement with the end orifice portion of the polymer supply conduit. The present invention thus provides all of the operating benefits of a conventional needle valve while eliminating certain undesirable characteristics associated with conventional needle valves.

The needle valve of the present invention is especially useful in association with the formation of blown polystyrene bottles which are formed from a preform parison which is created through the injection molding process. It has been discovered that in order to provide an economically feasible polystyrene bottle (i.e. in general, a bottle having a wall thickness of less than about 0.020 inches) the undesirable characteristics associated with the use of conventional needle valves in the injection molding process must be eliminated. Thus the present invention may comprise an injection mold apparatus for forming elongate polystyrene parisons for carbonated beverage containers comprising:

(a) polymer supply means for providing a supply of high pressure, high viscosity molten polymer;

(b) mold cavity means for receiving molten polymer therein for forming a polystyrene parison;

(c) conduit means positioned between said polymer supply means and said mold cavity means for providing a selectively interruptable flow of polymer therebetween;

(d) injection means operatively associated with said conduit means for receivingly accepting polymer from said conduit means in a charging mode, and for injectingly discharging polymer in a discharging mode to provide an injection polymer flow through a portion of said conduit means to said mold cavity means;

(e) gate valve means operatively associated with said conduit means for selectively permitting or preventing fluid communication between said conduit means and said mold cavity means;

said gate valve means comprising:

(i) elongate passage means for directing a fluid flow of polymer therethrough, having a central longitudinal axis and terminating in an outlet orifice;

(ii) needle means having a central longitudinal axis positioned in intersecting nonparallel relationship with said central longitudinal axis of said elongate passage means; said needle means having a terminal tip portion and being selectively movable between a closed state wherein said needle tip portion is positioned in sealing relationship in said orifice means whereby fluid flow therethrough is prevented, and an open state wherein said needle means is withdrawn from said elongate passage means whereby unrestricted fluid flow through said passage means is provided.

OBJECTS OF THE INVENTION

It is an object of the present invention to provide an injection molding device capable of producing a polystyrene parison capable of being utilized in an economically feasible blow molded plastic bottle for pressurized beverages.

It is a further object of the invention to provide a gate valve for use in an injection mold which, within certain operating ranges, eliminates or substantially reduces the occurrence of weld lines and other undesirable features in the finished plastic product as compared to products produced using conventional injection molding apparatus.

It is a further object of the invention to provide a gate valve including a terminal straight length portion of a polymer supply conduit which sealingly receives a needle portion of a needle valve through a sidewall of the conduit in a skewed relationship therewith such that the needle is extendable into closing relationship with an orifice at the end portion of the conduit and such that the needle is capable of being withdrawn a relatively short distance to a position outside the conduit so as to provide an unrestricted flow path at the terminal portion of the conduit.

DETAILED DESCRIPTION OF THE INVENTION

Figure 1:
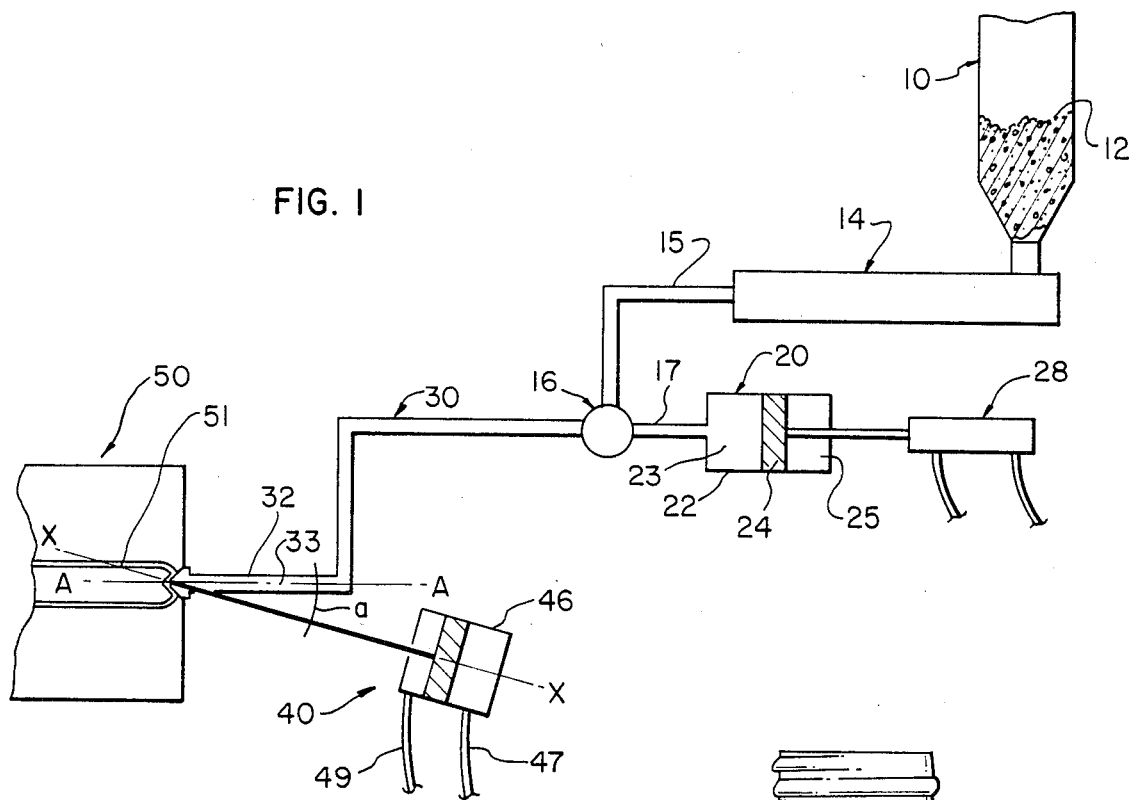
FIG. 1 is a schematic view of an injection mold apparatus of the present invention.

The present invention is directed to a needle valve gate assembly for use in an injection molding device that is used to make molded plastic items such as parison preforms for plastic bottles. The apparatus which incorporates the invention, as shown in FIG. 1, may include a polymer supply means such as a hopper 10 which receives plastic polymer pellets 12 which are gravity fed into an auger or screw device 14. The screw device narrows in pitch as it progresses away from the hopper and thus causes a significant pressure and temperature build up in the plastic pellets causing the pellets to liquify and pass out the end portion of the auger as a high viscosity, high temperature, e.g. 370 degrees F. to 450 degrees F.; high pressure e.g. 15,000 psig to 20,000 psig, fluid. (The exemplary parameter values are for polystyrene plastic having a molecular weight Mw (weight average, molecular weight) between about 35,000 and 400,000. The fluid passes through conduit 15 into a rotary valve 16 which is also connected to an injection means such as shooting pot assembly 20 by conduit 17, and a mold cavity 51 of mold 50 by an injection conduit 30. The shooting pot assembly includes a cylinder 22 with a movable piston 24 therein. The piston 24 divides the cylinder 22 into first and second variable volume chambers 23, 25. The first chamber 23 alternately receives molten polymer therein when three-way valve 16 is positioned to connect the auger 14 outlet with the chamber 23, and dispenses molten polymer therefrom when the three-way valve 16 is positioned to connect the chamber 23 to the injection line 30. Variable, reversible pressure is selectively applied to the piston 24 to allow chamber 26 to receive and dispense the fluid polymer. The variable pressure may be produced by a conventional hydraulic cylinder unit 28.

To cause polymer to be injected into mold cavity 51, rotary valve 16 is positioned to place chamber 23 in fluid communication with line 30, then piston 24 is extended to decrease the volume of chamber 23 and to thereby cause liquid polymer to flow through line 30 into mold cavity 51. The polymer injection apparatus as thus far described, except for the needle valve which is described hereafter, is conventional and well known in the art.

Figure 4:
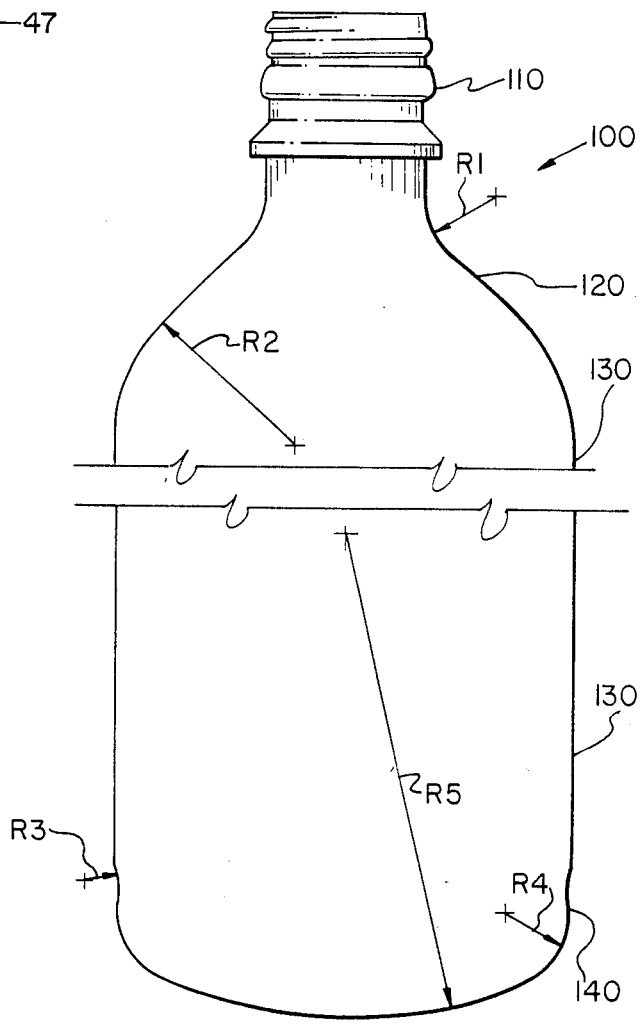
FIG. 4 is a cross sectional view of a blow molded polystyrene container formed from a preform parison produced by an injection mold apparatus.
Figure 2:
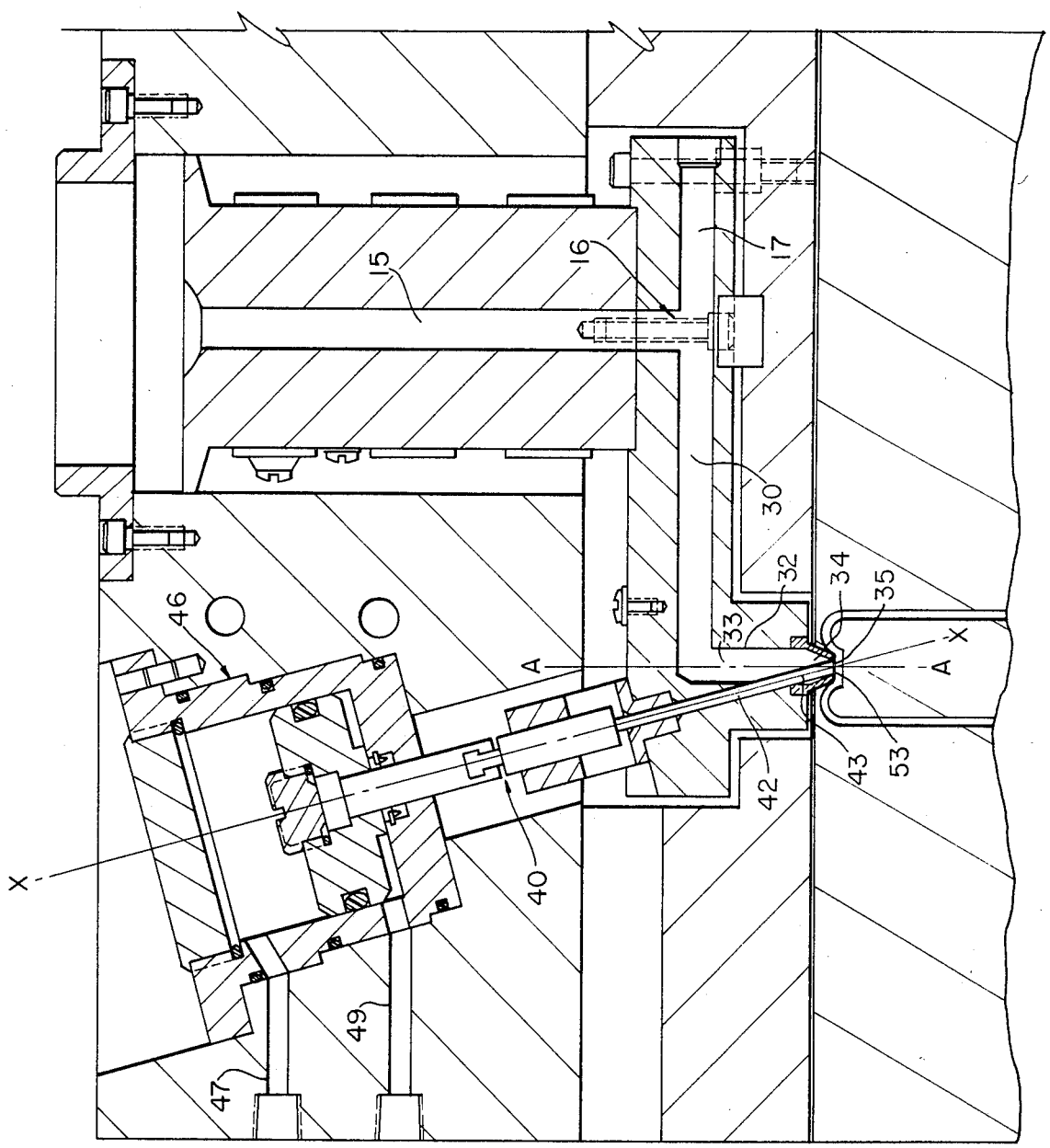
FIG. 2 is a detailed cross sectional view of a gate portion of the injection mold illustrated schematically in FIG. 1, in a closed position.
Figure 3:
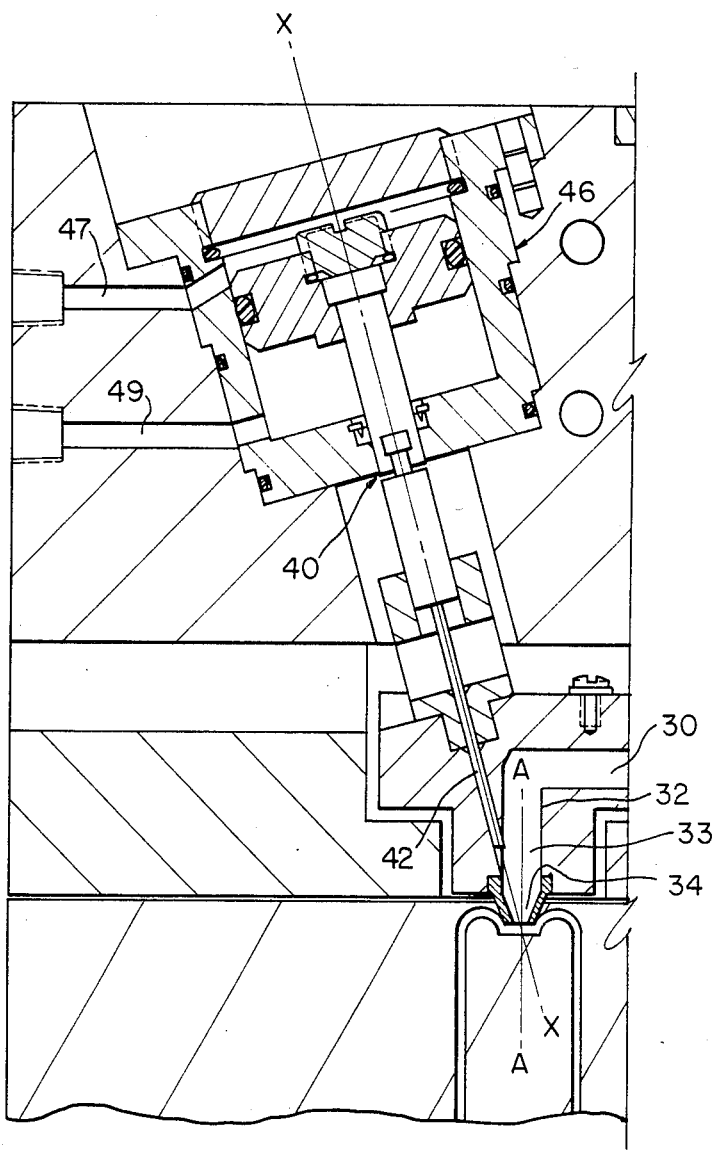
FIG. 3 is a detailed cross sectional view of the gate portion of FIG. 2 in a closed position.

A gate valve means such as needle valve assembly 40 is provided in a straight length end portion 32 of conduit 30. Conduit portion 32 has an elongate passage 33 with a central longitudinal axis AA. The needle valve assembly comprises a needle means such as needle 42 having a central longitudinal axis XX extending in non-parallel relationship with axis AA of conduit portion 32. The needle assembly 40 may be placed in an open position FIG. 3, to allow flow of the polymer through line 30 and may also be placed in a closed position, FIG. 2, to stop flow through line 30. As best shown in FIG. 2, the tip 43 of needle 42 seats in a restricted conical shaped end portion 34. Conical shaped end portion 34 terminates in a circular orifice 35 which communicates with orifice 53 of mold cavity 51. When it is desired to allow flow through line 30, needle 42 is withdrawn from the orifice 35 thus allowing flow of polymer through the mold cavity orifice 53 into mold cavity 51. In a preferred embodiment used for forming polystyrene preforms for blow molded bottles, the cross sectional area of line portion 32 is between 0.05 square inches and 0.5 square inches and preferably about 0.1 square inches. Line portion 32 and passage 33 may have an axial length of at least twice the diameter of line portion 32. Needle 42 may have a cross sectional area between 0.003 square inches and 0.03 square inches and preferably about 0.02 square inches. The axial distance which needle 42 moves maybe between 0.50 and 1.5 and is preferably about 0.50 inches for formation of a parison used to produce a bottle such as described below with reference to FIG. 4.

A hydraulic unit 46 having hydraulic lines 47, 49 is provided for moving the needle 42 into and out of engagement with conical end portion 34.

In the present invention, the needle valve center line axis XX is positioned at an acute angle "a" with respect to the center line AA of straight length conduit portion 32. Angle "a" may be between 10 degrees and 20 degrees and is preferably substantially 15 degrees.

This angular relationship between axis AA and XX facilitates needle 42 being completely withdrawn from the inflow line 32 by axial movement of a relatively short distance, e.g. between 0.5 inches and 1.5 inches and preferably about 0.5 inches in a conduit portion 32 having a cross sectional area of between 0.05 square inches and 0.5 square inches and preferably about 0.1 square inches. Complete withdrawal of needle 42 allows the fluid polymer to flow through orifice 48 unobstructed (without separating around the needle 42). It has been found that use of such a gate arrangement allows the injection temperature of polystyrene plastic to be reduced by about 30 to 40 degrees Fahrenheit below the lower operating limit (i.e. the temperature below which weld lines occurr) of an identical apparatus using an "in line" needle valve.

It has been found that use of such an angularly skewed needle assembly may be necessary to the formation of parisons formed from polystyrene if the parisons are subsequently used to produce beverage bottles which are used as containers for pressurized beverages, e.g. 30 psig for beer, and 60 psig for soft drinks. To be commercially feasible, such plastic beverage bottles made from polystyrene must have a wall thickness of about 0.020 inches or less for a 16.9 ounce bottle having a generally cylindrical wall about 2.86 inches in diameter. One embodiment of the invention may be used to produce polystyrene bottles having the following dimensions see FIG. 4:

Bottle neck 110: Diameter=1.016 inches; Overall axial length (to shoulder)=1.118 inches;

Shoulder 120: Outer radius R.=0.375 inches; Inner radius Rz=1.125 inches; Overall axial length=1.507 inches; Minimum Diameter=1.016 inches; Maximum Diameter=2.819 inches;

Side wall 130: Diameter=2.819 inches; Axial Length=3.435 inches;

Bottom Wall 140: Overall axial length=1.000 inch; Outer raidus R3=0.210 inches; Inner Radius R4=0.435 inches; Bottom Radius R5=3.000 inches;

Bottle 100 overall length=7.060 inches; Fluid capacity=approximately 0.5 liters.

Such a bottle configuration can withstand normal beverage pressures only if weld lines and the like caused by the use of in-line needles are eliminated as by use of the skewed needle valve of the present invention.

It is contemplated that the inventive concepts herein described may be variously otherwise embodied and it is intended that the appended claims be construed to include alternative embodiments of the invention except insofar as limited by the prior art.

What is claimed is:

1. An injection mold apparatus for forming elongate polystyrene parisons for carbonated beverage containers which are relatively free of weld lines comprising:
   (a) polymer supply means for providing a supply of high pressure, high viscosity molten polystrene polymer;
   (b) mold cavity means for receiving molten polymer therein for forming a polystyrene parison;
   (c) conduit means positioned between said polymer supply means and said mold cavity means for providing a selectively interruptable flow polymer therebetween;
   (d) injection means operatively associated with said conduit means for receivingly accepting polymer from said conduit means in a charging mode, and for injectingly discharging polymer in a discharging mode to provide an injection polymer flow through a portion of said conduit means to said mold cavity means;
   (e) gate valve means operatively associated with said conduit means for selectively permitting or preventing fluid communication between said conduit means and said mold cavity means;
   said gate valve means comprising:
      (i) elongate passage means for directing a fluid flow of polymer therethrough, having a central longitudinal axis and terminating in an outlet orifice means;
      (ii) needle means having a central longitudinal axis positioned in intersecting nonparallel relationship with said central longitudinal axis of said elongate passage means; said needle means having a terminal tip portion and being selectively movable between a closed state wherein said needle tip portion is positioned in sealing relationship in said orifice means whereby fluid flow therethrough is prevented, and an open state wherein said needle means is withdrawn from said elongate passage means whereby unrestricted fluid flow through said passage means is provided whereby weld line formation from flow obstruction is prevented.

2. The invention of claim 1 wherein the angle of incidence between said longitudinal axis of said elongate passage means and said longitudinal axis of said needle means is between 10 degrees and 20 degrees.

3. The invention of claim 1 wherein the angle of incidence between said longitudinal axis of said elongate passage means and said longitudinal axis of said needle means is substanially 15 degrees.

4. The invention of claim 1 further comprising needle means insertion and withdrawal means for selectively moving said needle means between said open state and said closed state.

5. The invention of claim 4 wherein said needle insertion means comprises power cylinder means having a reciprocally movable piston portion operatively associated with said needle means.

6. The invention of 1, 2 or 3 wherein said elongated passage means has a cross sectional area of between 0.05 square inches and 0.5 square inches and wherein said needle means has a cross sectional area of between 0.003 square inches and 0.02 square inches and wherein said elongate passage has a length of at least twice the diameter of said elongate passage.

7. The invention of claim 6 wherein the axial distance of travel of said needle means between said open state and said closed state is between 0.5 inches and 1.5 inches.

8. The invention of claim 1 wherein the injection temperature of said polymer is between 370 degrees Fahrenheit and 450 degrees Fahrenheit.

9. The invention of claim 8 wherein the injection pressure of said polymer is between 15,000 and 20,000 psi.

10. The invention of claim 1 wherein said polystyrene parison formed by said mold cavity means comprises:
    an elongate generally cylindrical body having a relatively constant cross sectional diameter and having one closed end and one open end;
    said elongate body having a relatively constant wall thickness throughout most of its length of between 0.020 inches and 0.160 inches, and having an internal diameter between 0.75 inches and 2.5 inches and having a length between 4 inches and 7 inches.

11. An injection mold apparatus for forming elongate polystyrene parisons for carbonated beverage containers which are relatively free of weld lines comprising:
    (a) polymer supply means for providing a supply of high pressure, high viscosity molten polystyrene polymer;
    (b) mold cavity means for receiving molten polymer therein for forming a polystyrene parison;
    (c) conduit means positioned between said polymer supply means and said mold cavity means for providing a selectively interruptable flow of polymer therebetween;
    (d) injection means operatively associated with said conduit means for receivingly accepting polymer from said conduit means in a charging mode, and for injectingly discharging polymer in a discharging mode to provide an injection polymer flow through a portion of said conduit means to said mold cavity means;
    (e) gate valve means operatively associated with said conduit means for selectively permitting or preventing fluid communication between said conduit means and said mold cavity means;
    said gate valve means comprising:
       (i) elongate passage means for directing a fluid flow of polymer therethrough, having a central longitudinal axis and terminating in an outlet orifice means;
       (ii) needle means having a central longitudinal axis positioned in intersecting nonparallel relationship with said central longitudinal axis of said elongate passage means; said needle means having a terminal tip portion and being selectively movable between a closed state wherein said needle tip portion is positioned in sealing relationship in said orifice means whereby fluid flow therethrough is prevented, and an open state wherein said needle means is withdrawn from said elongate passage means whereby unrestricted fluid flow through said passage means is provided whereby weld line formation from flow obstruction is prevented;
       (iii) needle means insertion and withdrawal means for selectively moving said needle means between said open state and said closed state; said needle insertion means comprising power cylinder means having a reciprocally movable piston portion operatively associated with said needle means;

wherein said elongate passage means has a cross sectional area of between 0.05 square inches and 0.5 square inches and wherein said needle means has a cross sectional area of between 0.003 square inches and 0.02 square inches and wherein said elongate passage has a length of twice its diameter;

wherein the axial distance of travel of said needle means between said open state and said closed state is between 0.5 inches and 1.5 inches;

wherein the injection temperature of said polymer is between 370 degrees Fahrenheit and 450 degrees Fahrenheit;

wherein the injection pressure of said polymer is between 15,000 and 20,000 psi;

wherein said polystyrene parison formed by said mold cavity means comprises:

an elongate generally cylindrical body having a relatively constant cross sectional diameter and having one closed end and one open end;

said elongate body having a relatively constant wall thickness throughout most of its length of between 0.02 inches and 0.160 inches, and having an internal diameter between 0.75 inches and 2.5 inches and having a length between 4 inches and 7 inches.

12. A method of controlling the flow of liquid polymer to prevent formation of weld lines in a parison formed by an injection molding apparatus having polymer supply means for providing a supply of high pressure, high viscosity molten polymer; mold cavity means for receiving molten polymer therein for forming a polystyrene parison, conduit means positioned between said polymer supply means and said mold cavity means for providing a selectively interruptable flow of polymer therebetween; injection means operatively associated with said conduit means for receivingly accepting polymer from said conduit means in a charging mode, and for injectingly discharging polymer in a discharging mode to provide an injection polymer flow through a portion of said conduit means to said mold cavity means; and gate valve means operatively associated with said conduit mean for selectively permitting or preventing fluid communication between said conduit means and said mold cavity means; said gate valve means comprising elongate passage means for directing a fluid flow of polymer therethrough, having a central longitudinal axis and terminating in an outlet orifice; and having needle means for opening and closing said outlet orifice comprising the steps of:

(a) totally withdrawing said needle means from said elongate cavity means so as to provide an unobstructed flow passage for said polymer, to begin a mold injection;

(b) inserting a tip portion of the needle means into closing relationship with said outlet orifice of said elongate passage means, to terminate flow of polymer therethrough to terminate a mold injection.

* * * * *